(12) United States Patent
Hunt et al.

(10) Patent No.: US 9,490,975 B1
(45) Date of Patent: Nov. 8, 2016

(54) INFORMATION ASSURANCE FOR NETWORKED SYSTEMS

(75) Inventors: Jeffrey H. Hunt, Thousand Oaks, CA (US); Paul S. Idell, Thousand Oaks, CA (US)

(73) Assignee: THE BOEING COMPANY, Chicago, IL (US)

( * ) Notice: Subject to any disclaimer, the term of this patent is extended or adjusted under 35 U.S.C. 154(b) by 972 days.

(21) Appl. No.: 12/645,366

(22) Filed: Dec. 22, 2009

(51) Int. Cl.
*H04B 10/00* (2013.01)
*H04L 9/08* (2006.01)
*H04B 10/70* (2013.01)

(52) U.S. Cl.
CPC ............. *H04L 9/0852* (2013.01); *H04B 10/70* (2013.01); *H04L 9/0858* (2013.01)

(58) Field of Classification Search
CPC . H04L 9/0858; H04L 9/0852; H04L 9/0855; H04L 2209/80; H04B 10/70
USPC .................................................. 398/118–131
See application file for complete search history.

(56) References Cited

U.S. PATENT DOCUMENTS

| | | | | |
|---|---|---|---|---|
| 3,839,684 A * | 10/1974 | Matsuoka | ............... | H01S 3/086 359/814 |
| 5,062,154 A * | 10/1991 | Geller | .................. | H04B 10/112 250/372 |
| 6,191,384 B1 * | 2/2001 | Hennessey | ........... | B23K 26/147 219/121.68 |
| 6,289,104 B1 * | 9/2001 | Patterson | .............. | H04L 9/0858 380/256 |
| 7,248,695 B1 * | 7/2007 | Beal | ...................... | H04L 9/0852 380/256 |
| 7,805,079 B1 * | 9/2010 | Meyers | .................. | H04B 10/11 398/118 |
| 2001/0035995 A1 * | 11/2001 | Ruggiero | ........... | H04B 10/1121 398/118 |
| 2001/0055389 A1 * | 12/2001 | Hughes | ................. | H04L 9/0858 380/44 |
| 2002/0048370 A1 * | 4/2002 | Hirota | ................... | H04L 9/0858 380/278 |
| 2005/0029236 A1 * | 2/2005 | Gambino | .......... | H01L 21/76838 219/121.69 |
| 2005/0152540 A1 * | 7/2005 | Barbosa | ............... | H04L 9/0858 380/28 |
| 2005/0177307 A1 * | 8/2005 | Greenfeld | ................ | F41G 5/14 701/409 |

(Continued)

OTHER PUBLICATIONS

Network topology (1999). [Online]. In Focal dictionary of telecommunications, focal press. London, United Kingdom: Routledge. Available from: http://search.credoreference.com/content/entry/bhfidt/network_topology/0 [Accessed Jan. 30, 2015].*

(Continued)

*Primary Examiner* — David Payne
*Assistant Examiner* — Tanya Motsinger
(74) *Attorney, Agent, or Firm* — Vista IP Law Group LLP; Cynthia A. Dixon

(57) ABSTRACT

A system and method are disclosed for information assurance for networked systems. The system and method involve a quantum key distribution (QKD) source, a gimbaling device, a receiver, and a sender. The QKD source is mounted on the gimbaling device, and the QKD source propagates energy into an oversized spot beam. The receiver and the sender are within optical communication of each other. The gimbaling device performs pointing acquisition tracking only as necessary to keep the receiver located within the oversized spot beam. When the receiver is located within the oversized spot beam, the QKD source performs a QKD function. In one or more embodiments, the gimbaling device is mounted on a mobile platform. In some embodiments, the mobile platform is mounted on an unmanned aerial vehicle (UAV). In other embodiments, the mobile platform is mounted on a small ground vehicle.

20 Claims, 3 Drawing Sheets

(56) References Cited

U.S. PATENT DOCUMENTS

| | | | |
|---|---|---|---|
| 2006/0120529 A1* | 6/2006 | Gisin | H04L 9/0852 380/256 |
| 2006/0181761 A1* | 8/2006 | Chalfant | G02B 26/0841 359/290 |
| 2007/0071245 A1* | 3/2007 | Kuang | H04L 9/0855 380/278 |
| 2008/0013738 A1* | 1/2008 | Tajima | H04L 9/0852 380/278 |
| 2008/0267635 A1* | 10/2008 | Kawamoto | H04B 10/548 398/141 |
| 2008/0292102 A1* | 11/2008 | Wang | H04L 9/0852 380/275 |
| 2010/0034390 A1* | 2/2010 | Yamamoto | H04L 9/0858 380/278 |
| 2011/0069972 A1* | 3/2011 | Wiseman | H04L 9/0852 398/186 |
| 2012/0195597 A1* | 8/2012 | Malaney | H04L 9/0852 398/115 |
| 2015/0155936 A1* | 6/2015 | Liu | H04B 10/116 380/256 |

OTHER PUBLICATIONS

"Quantum cryptography," Wikipedia, the free encyclopedia, Nov. 12, 2009. http://en.wikipedia.org/wiki/Quantum_key_distribution.

Bennett, Charles H. and Brassard, Gilles, "Quantum Cryptography: Public Key Distribution and Coin Tossing," International Conference on Computers, Systems & Signal Processing, Dec. 10-12, 1984.

Buttler, W.T., et al., "Practical Free-Space Quantum Key Distribution over 1 km," *Physical Review Letters*, Oct. 12, 1998, vol. 81, No. 15, The American Physical Society.

* cited by examiner

INFORMATION ASSURANCE FOR NETWORKED SYSTEMS

RELATED APPLICATION

This application is related to U.S. patent application Ser. No. 11/753,940, filed May 25, 2007, the contents of which are incorporated by reference herein in its entirety.

BACKGROUND

The present disclosure relates to information assurance for networked systems. In particular, it relates to a system and method to create a schematic for operational use of a quantum key distribution (QKD) terminal in a free space environment.

SUMMARY

The present disclosure relates to a system, apparatus, and method for information assurance for networked systems. In one or more embodiments, the method for information assurance for networked systems involves providing a quantum key distribution (QKD) source, and mounting the QKD source on a gimbaling device. The method further involves propagating energy from the QKD source into an oversized spot beam. Also, the method involves assuring that a receiver and a sender are within optical communication of each other. Further, the method involves performing pointing acquisition tracking with the gimbaling device only as necessary to keep the receiver located within the oversized spot beam, and performing a QKD function.

In one or more embodiments, the QKD source is a pulsed laser. In some embodiments, the pulsed laser propagates a stream of pulses at a rate of one (1) pulse per pico second. In at least one embodiment, the QKD source is a ten (10) Watt laser having a one (1) millimeter (mm) diameter. In one or more embodiments, the pointing accuracy of the gimbaling device is within one (1) milliradian.

In some embodiments, the receiver receives no more than one photon of energy within a given key gating interval. In at least one embodiment, the gimbaling device is mounted on a mobile platform. In some embodiments, the mobile platform is mounted on an unmanned aerial vehicle (UAV). In other embodiments, the mobile platform is mounted on a small ground vehicle.

In one or more embodiments, the system for information assurance for networked systems involves a receiver and a sender that are within optical communication of each other. The system further involves a quantum key distribution (QKD) source, where the QKD source propagates energy into an oversized spot beam. Further, the system involves a gimbaling device, where the QKD source is mounted on the gimbaling device. Also, the system involves the gimbaling device performing pointing acquisition tracking only as necessary to keep the receiver located within the oversized spot beam. Additionally, the system involves the QKD source performing a QKD function when the receiver is located within the oversized spot beam.

In some embodiments, the system for information assurance for networked systems involves a receiver means and a sender means that are within optical communication of each other. Also, the system involves a quantum key distribution (QKD) source means, where the QKD source means propagates energy into an oversized spot beam. Further, the system involves a gimbaling device means, where the QKD source means is mounted on the gimbaling device means. Additionally, the system involves the gimbaling device means performing pointing acquisition tracking only as necessary to keep the receiver means located within the oversized spot beam. The system further involves the QKD source means performing a QKD function when the receiver means is located within the oversized spot beam.

In one or more embodiments, the QKD source means is a pulsed laser means. In some embodiments, the pulsed laser means propagates a stream of pulses at a rate of one (1) pulse per pico second. In at least one embodiment, the QKD source means is a ten (10) Watt laser means having a one (1) millimeter (mm) diameter. In some embodiments, the pointing accuracy of the gimbaling device means is within one (1) milliradian.

In one or more embodiments, the receiver means receives no more than one photon of energy within a given key gating interval. In at least one embodiment, the gimbaling device means is mounted on a mobile platform means. In some embodiments, the mobile platform means is mounted on an unmanned aerial vehicle (UAV). In other embodiments, the mobile platform means is mounted on a small ground vehicle.

DRAWINGS

These and other features, aspects, and advantages of the present disclosure will become better understood with regard to the following description, appended claims, and accompanying drawings where:

DESCRIPTION

Figure 1:
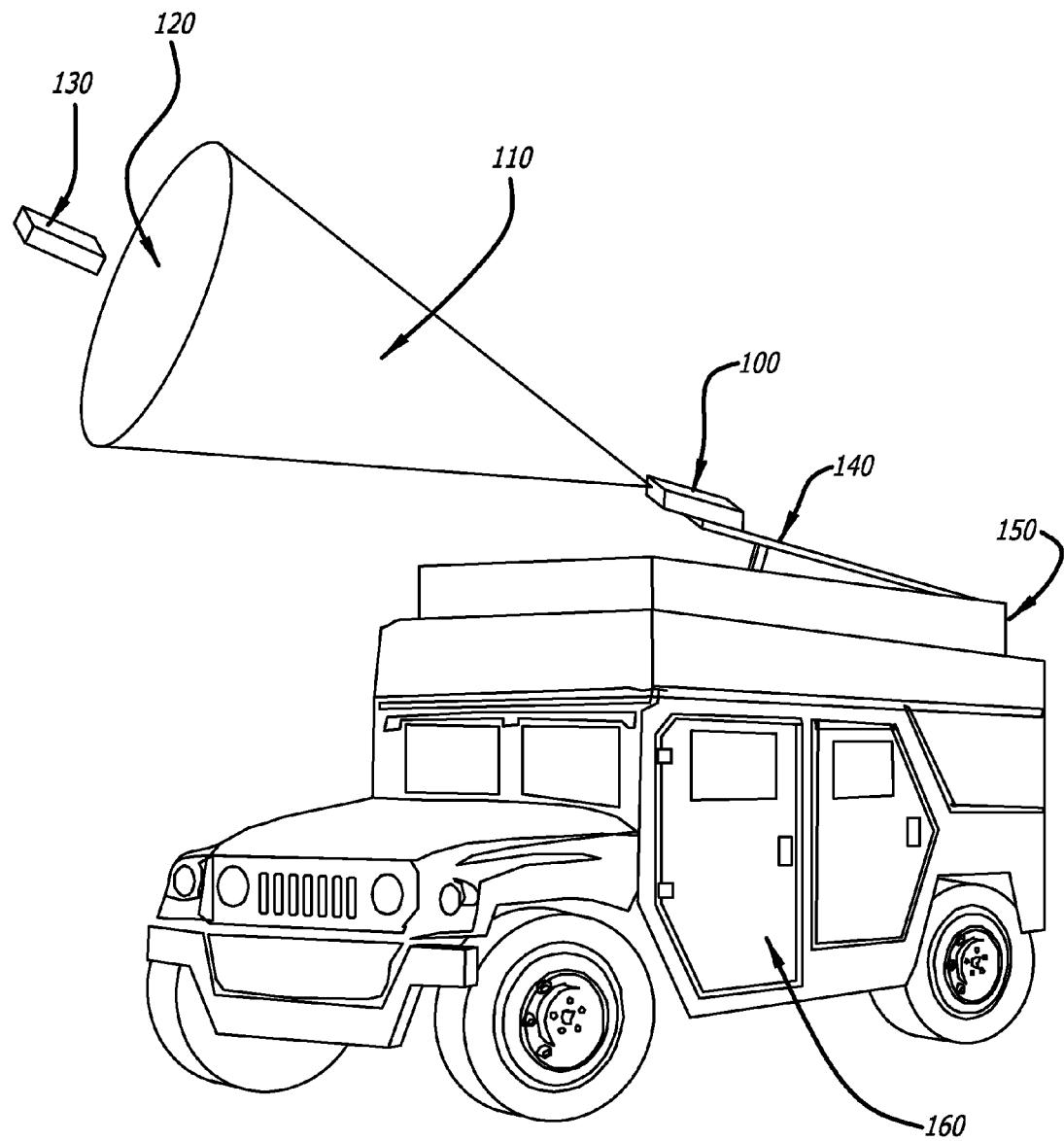
FIG. 1 depicts a graphical representation of the basic elements of the system for information assurance for networked systems, in accordance with at least one embodiment of the present disclosure.

The methods and apparatus disclosed herein provide an operative system for information assurance for networked systems. Specifically, this system allows for a schematic for operational use of a quantum key distribution (QKD) terminal in a free space environment.

In heritage point-to-point communications architectures, information assurance is typically realized in centralized key distribution systems. However, networks, which are fundamentally non-deterministic, require ad hoc key creation and distribution. Heritage architectures applied to networks inevitably try to force centralized assurance systems into their operation. At best, these are inefficient, creating massive temporal bottlenecks. And, at worst, they do not work.

Key distribution systems involve creating optical links between those communicators who wish to establish a link. In most cases, optical communications require very precise pointing, which typically requires an increase in the weight, volume, and complexity of the hardware. This increase in the weight and volume of the hardware makes its use within a tactical scenario problematic at best.

In most cases, communications systems struggle to increase the amount of electromagnetic radiation acquired in the detection apparatus. As a result, the application of optical systems requires the use of large, heavy gimbals to point, acquire, and maintain tracking while communicating. The size and weight of the gimbal is normally the limiting element to the application platform.

The present disclosure teaches a system and method that uses a quantum distribution system. With quantum distribution systems, the signal levels must be reduced so that no more than one photon arrives at the receiver within a given key gating interval. As such, in many quantum key situations, the signals must be strongly attenuated. One way to attenuate the received signal is to overfill the receiver. When doing so, most of the signal intensity is lost. However, a large receiving spot beam allows for a gimbal mechanism to be used of a small size and lightweight because the accuracy of the pointing of the gimbaling mechanism can drop significantly while still maintaining a small amount of the light energy that enters into the receiver.

Another way to reduce the received signal is to maintain the same pointing accuracy, and just to reduce the transmitted signal intensity. However, this way does not solve the problem of the heavy gimbaling mechanism.

Information assurance in a networked environment requires encryption and, more generally, key management, which includes creation, distribution, and monitoring. The disclosed system and method provide a systematic means to provide keys to individual participants in a geographically distributed optical communications network that is deployed in a battle space, strategic or tactical area. The keys, while provided on an ad hoc basis, can be accomplished without individual participants trying to act as their own connection facilitators. With the use of lighter weight gimbals, the key distribution system can be applied to many mobile platforms that could not be used with heavier gimbals.

Advanced Information Assurance requires an architecture that represents a major paradigm shift from physical space representations. In contrast to the platform based or physically based architecture, which has traditionally been point to point in representation, cyberspace architectures are fundamentally network based. That is, each hardware element in the system is modeled merely as a node through which information can pass. As such, the engagement space is now an N-dimensional construct that operates in an ad hoc fashion, where communicators are engaged, disengaged, etc., without preconceived information flow points.

The vast majority of this information will be moving in an optically networked environment and may involve freespace configurations in addition to fiber optic based implementation. There will be many physical opportunities for unauthorized eavesdroppers to invade the information architecture and to (A) intercept strategic information and (B) plant false information to other users. Information assurance will be the key to any successful implementation of network centric warfare. Assurance is most straightforwardly accomplished through the encryption of the digital data.

The incorporation of Quantum Key Distribution for Information Architecture has been well established within the research community. Quantum Key Distribution is a technology is based on the stochastic nature of quantum mechanical behaviors. The basic principle operates as follows. In many physical processes, a quantum mechanical process will produce photons whose wave functions are coupled. This coupling is referred to as quantum entanglement. With this entanglement, the particles exist in a superposition of physical properties.

To make this explanation more concrete, consider a specific example. If a physical process produces two entangled optical photons, the entangled state allows the photons to carry two properties simultaneously. If we consider the photon polarization, the photons carry the two orthogonal polarizations simultaneously. The photon polarization looses this ambiguity only when it is measured.

When this measurement takes place, the photons become disentangled. The portion of the wave function that connects the two photons collapses. The only connection between the behaviors of the photons is that, knowing the polarization state of one photon allows you to know instantaneously the state of the other photon. Assigning a 0 and a 1 to each photon state allows the two nonlocal communicators to receive a string of random bits that can be used to create the encryption key.

The features that this system possesses are apparent from the physical properties. First, this process is not based on an algorithm. That is, the physical process that creates the key is truly random. As such, the encryption cannot be broken by any means. Second, the key is not created until it is ready to be used. If someone were to intercept the encryption device, there would be no loss of assurance, because there is no key present in the system. Third, since the scheme uses photons, the key creation travels at the speed of light, so that the key can be shared remotely between users. Lastly, when the polarization property is measured and the wave function collapses, it cannot be classically reconstructed or simulated. The implication is that, if an eavesdropper is present on the line, the relative probabilities of the created bits will be disturbed. An eavesdropper can therefore be detected. The security of the information distribution can be assured with approximately 100% certainty.

In the following description, numerous details are set forth in order to provide a more thorough description of the system. It will be apparent, however, to one skilled in the art, that the disclosed system may be practiced without these specific details. In the other instances, well known features have not been described in detail so as not to unnecessarily obscure the system.

FIG. 1 shows a graphical representation of the basic elements of the system for information assurance for networked systems, in accordance with at least one embodiment of the present disclosure. In this figure, it can be seen that a quantum key distribution (QKD) source 100 is transmitting a key distribution beam 110. The large oversized spot beam 120 of the key distribution beam 110 is shown to overfill the receiver 130.

Also shown in this figure is the quantum key distribution (QKD) source being mounted on a gimbaling device 140. The gimbaling device 140 is shown to be mounted on a mobile platform 150. In this figure, the mobile platform 150 is shown to be mounted on a small ground vehicle 160. Types of small ground vehicles 160 that may be used with the disclosed system and method include, but are not limited to, small-unmanned ground vehicles (SUGVs). In alternative embodiments, the mobile platform 150 may be mounted on unmanned aerial vehicles (UAVs).

In one or more embodiments, the QKD source 100 is a pulsed laser. Types of lasers that may be employed for the disclosed system and method include, but are not limited to, quantum mechanical downconversion lasers and linear optics lasers that generate entangled photons. In some embodiments, the pulsed laser propagates a stream of pulses at a rate of one (1) pulse per pico second. In at least one embodiment, the QKD source 100 is a ten (10) Watt laser having a one (1) millimeter (mm) diameter. In this embodiment, if the 10 Watt laser with a one (1) millimeter (mm) diameter generates a ten (10) meter spot 120, the resulting receiver intensity will be reduced by eight (8) orders of magnitude, assuming that the receiver has a one (1) millimeter (mm) aperture, which is the same size as the source diameter. And, assuming that the laser produces a stream of 1 pico second pulses, the average 1 pico second pulse window will contain less than one photon per pulse, which is appropriate for QKD. If the propagation distance is 10 kilometers (km), the pointing angle is one (1) milliradian. As such, the pointing accuracy of the gimbaling device 140 of some fraction of 1 milliradian must be maintained. This pointing accuracy is easily achieved, even with a light weight, not particularly accurate, gimbaling device 140.

Figure 2:
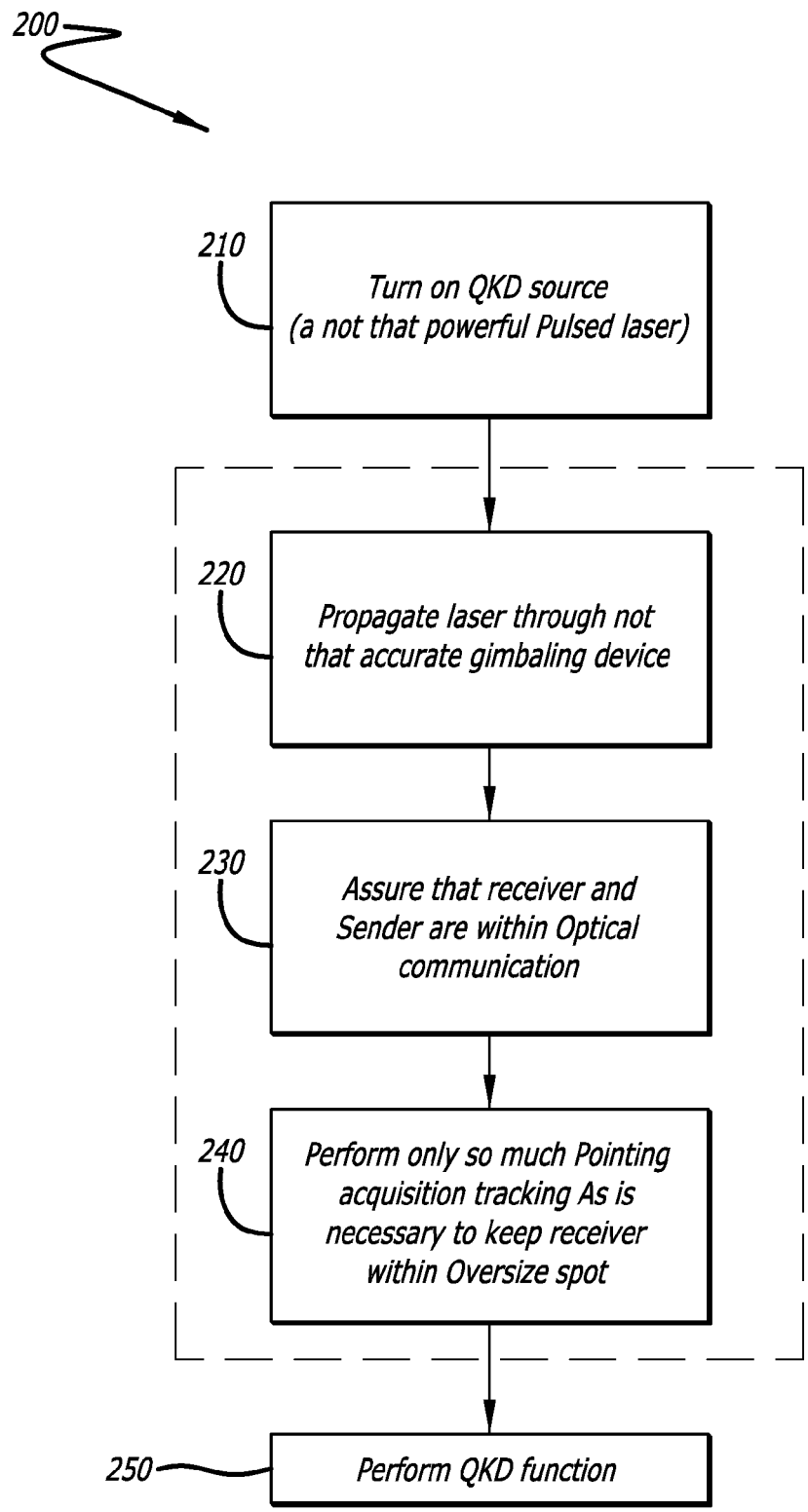
FIG. 2 shows a simplified block diagram of the method for information assurance for networked systems, in accordance with at least one embodiment of the present disclosure.

FIG. 2 illustrates a simplified block diagram 200 of the method for information assurance for networked systems, in accordance with at least one embodiment of the present disclosure. In this figure, the QKD source is first turned on 210. After the QKD source is turned on 210, the laser of the QKD source, which is mounted on the gimbaling device (i.e. a not that accurate gimbaling device), propagates energy 220 into an oversized spot beam. Then, the receiver and the sender must be confirmed to be within optical communication of each other. After it is confirmed that the receiver and the sender are within optical communication of each other, pointing acquisition tracking with the gimbaling device is performed only as necessary to keep the receiver located within the oversized spot beam 240. Then, when the receiver is located within the oversized spot beam, the QKD source performs a QKD function 250.

Figure 3:
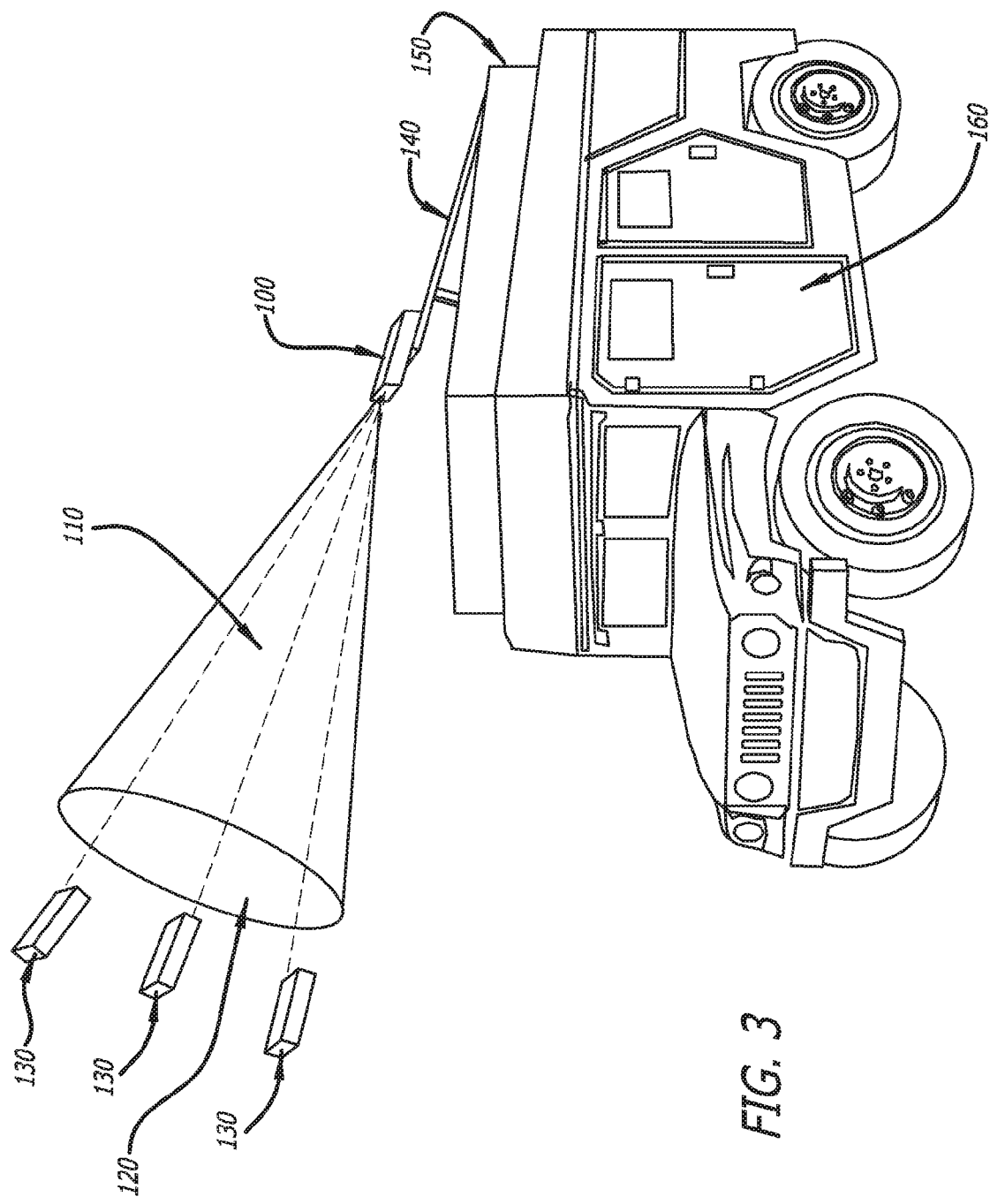
FIG. 3 depicts a graphical representation of the disclosed system for information assurance for networked systems employing free-space configurations for moving information, in accordance with at least one embodiment of the present disclosure.

FIG. 3 depicts a graphical representation of the disclosed system for information assurance for networked systems employing free-space configurations for moving information, in accordance with at least one embodiment of the present disclosure. In this figure, the quantum key distribution (QKD) source 100 is shown to be employing free-space configurations for moving information by transmitting a key distribution beam 110 to receivers 130.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

We claim:

1. A method for information assurance for networked systems, the method comprising:
   providing a quantum key distribution (QKD) source for point-to-multipoint communication;
   mounting the QKD source on a gimbaling device;
   transmitting, from the QKD source, an oversized spot beam such that no more than one photon arrives at a receiver within a specified QKD interval, thereby overfilling the receiver;
   assuring that the receiver and a sender are within optical communication of each other;
   performing pointing acquisition tracking with the gimbaling device only as necessary to keep the receiver located within the oversized spot beam; and
   performing a QKD function.

2. The method for information assurance for networked systems of claim 1, wherein the QKD source is a pulsed laser.

3. The method for information assurance for networked systems of claim 2, wherein the pulsed laser propagates a stream of pulses at a rate of one (1) pulse per pico second.

4. The method for information assurance for networked systems of claim 2, wherein the QKD source is a ten (10) Watt laser having a one (1) millimeter (mm) diameter.

5. The method for information assurance for networked systems of claim 1, wherein the pointing accuracy of the gimbaling device is within one (1) milliradian.

6. The method for information assurance for networked systems of claim 1, wherein the receiver receives no more than one photon of energy within a given key gating interval.

7. The method for information assurance for networked systems of claim 1, wherein the gimbaling device is mounted on a mobile platform.

8. The method for information assurance for networked systems of claim 7, wherein the mobile platform is mounted on an unmanned aerial vehicle (UAV).

9. The method for information assurance for networked systems of claim 7, wherein the mobile platform is mounted on a small ground vehicle.

10. A system for information assurance for networked systems, the system comprising:
    a receiver and a sender that are within optical communication of each other;
    a quantum key distribution (QKD) source for point-to-multipoint communication, wherein the QKD source transmits an oversized spot beam such that no more than one photon arrives at the receiver within a specified QKD interval, thereby overfilling the receiver; and
    a gimbaling device, wherein the QKD source is mounted on the gimbaling device,
    the gimbaling device performs pointing acquisition tracking only as necessary to keep the receiver located within the oversized spot beam,
    when the receiver is located within the oversized spot beam, the QKD source performs a QKD function.

11. The system for information assurance for networked systems of claim 10, wherein the QKD source is a pulsed laser.

12. The system for information assurance for networked systems of claim 11, wherein the pulsed laser propagates a stream of pulses at a rate of one (1) pulse per pico second.

13. The system for information assurance for networked systems of claim 11, wherein the QKD source is a ten (10) Watt laser having a one (1) millimeter (mm) diameter.

14. The system for information assurance for networked systems of claim 10, wherein the pointing accuracy of the gimbaling device is within one (1) milliradian.

15. The system for information assurance for networked systems of claim 10, wherein the receiver receives no more than one photon of energy within a given key gating interval.

16. The system for information assurance for networked systems of claim 10, wherein the gimbaling device is mounted on a mobile platform.

17. The system for information assurance for networked systems of claim 16, wherein the mobile platform is mounted on an unmanned aerial vehicle (UAV).

18. The system for information assurance for networked systems of claim 16, wherein the mobile platform is mounted on a small ground vehicle.

19. A system for information assurance for networked systems, the system comprising:
    a receiver means and a sender means that are within optical communication of each other;
    a quantum key distribution (QKD) source means for point-to-multipoint communication, wherein the QKD source means transmits an oversized spot beam such that no more than one photon arrives at the receiver means within a specified QKD interval, thereby overfilling the receiver means; and a gimbaling device means, wherein the QKD source means is mounted on the gimbaling device means, the gimbaling device means performs pointing acquisition tracking only as necessary to keep the receiver means located within the oversized spot beam, when the receiver means is located within the oversized spot beam, the QKD source means performs a QKD function.

20. The system for information assurance for networked systems of claim 19, wherein the QKD source means is a pulsed laser means.

* * * * *